2,813,027

TREATMENT OF PROTEINACEOUS MATERIALS

George Bruce Galliver, Bromham, and Alan William Holmes, Rushden, England, assignors to Lever Brothers Company, New York, N. Y., a corporation of Maine No Drawing. Application August 12, 1955, Serial No. 528,137

Claims priority, application Great Britain August 26, 1954

21 Claims. (Cl. 99—111)

This invention relates to the treatment of proteinaceous materials to remove fishy smell and taste.

Fish flesh or the protein obtained therefrom has been extracted with alcohol with the object of removing its fishy smell and taste. The product so obtained retains, however, a residual smell and/or taste which are usually detectable in the product as such and which tend to be more pronounced in a product which has been subjected to heat. Heating an aqueous suspension or solution of the product at a pH in the range of about 6–8 under pressure in a closed vessel, which treatment is required in the preparation of certain food products, is a particularly critical test of residual smell and taste.

It has now been found that products with less or no smell or taste, even after such heat treatment, may be obtained by carrying out the alcohol extraction at a pH of at least 8 and/or in the presence of a reducing agent.

According to the invention there is provided a process of removing fishy smell and taste from a proteinaceous material which comprises subjecting the material to extraction with an alcohol at a pH of at least 8 or in the presence of a reducing agent.

Fish, preferably gutted fish, or protein obtained therefrom, as well as other proteinaceous materials, for instance whale meat, may be treated according to the invention. Excellent results are obtained with white sea fish, such as cod, whiting, haddock, sea-bream, coalfish, dogfish and catfish, and fresh water fish such as carp. The invention is, however, also applicable to fatty fish such as herring and to such low grade starting material as fish offal. With fatty materials the oil content should preferably be reduced before the treatment, for instance by means of a fat solvent or by pressure cooking followed by centrifuging.

Fish may be eviscerated and skinned, and the head removed, if a light coloured product is desired and any material to be treated should preferably be comminuted before the treatment.

The extraction is preferably carried out at a pH of at least 9. On the other hand, a pH in excess of 12 is liable to damage the protein nutritionally and tends to increase the rate of hydrolysis of the protein appreciably. The optimum pH value usually lies in the neighbourhood of 10. The required pH may conveniently be obtained by adding the requisite amount of aqueous alkali, for instance sodium or calcium hydroxide or sodium carbonate, to the material and mixing. The presence of carbonate tends to make for a softer final product whilst calcium has the opposite effect.

As an alternative to raising the pH, a reducing agent may be added to the material, for instance a salt, usually the sodium salt, of sulphurous acid such as a sulphite, metabisulphite or hydrosulphite; hydroxylamine or its salts; or reducing sugars such as glucose and lactose. It has been noted that the reducing sugars tend to impart brown colour and caramel flavour to the product, especially when it is heated, so that the use of some other reducing agent is preferred when whiteness and blandness of the product is desired. Reducing agents which are also bleaching agents are, of course, particularly desirable from the colour point of view.

The beneficial effect of the reducing agent is less marked below an amount of about 2.5% by weight (calculated on a dry weight basis) of the material to be treated. It is preferred to use about 5%. Thus with fresh white sea fish (which normally contains about 80% by weight water) the effect is less marked below about 0.5% by weight of the fish and it is preferred to use about 1%.

The combination of alkaline pH and the presence of a reducing agent results in a further improvement of the product.

In the preferred embodiment of the process the material, for instance fresh minced cod, is mixed with about 1% of its weight of sodium sulphite and sufficient sodium hydroxide solution to raise the pH of the mixture to about 10.

It is, of course, advantageous to dry the material before the alcohol extraction so as to prevent undue dilution of the alcohol and to allow the material to be stored, if desired, before the extraction. Roller-drying is one suitable method and it has been found that a certain amount of deflavouring and deodorising takes place during such drying. Sheet formation on the rollers takes place more readily at higher pH values and is very satisfactory at a pH of about 10. The presence of sulphite also promotes sheet formation whilst hydroxylamine tends to have the opposite effect.

It is preferred to use alcohols which contain no more than four carbon atoms. Ethyl and isopropyl alcohol are particularly suitable. Aqueous alcohols may be used, but the presence of a considerable proportion of water may be undesirable. With ethyl alcohol the water content should usually not exceed 50%, preferably not 25%, by volume.

A rise in extraction temperature tends to increase the efficiency of extraction. Hence, alcohol at or near its boiling point is preferably used and it may be preferable to extract under pressure greater than one atmosphere, particularly when treating low grade material such as herring or offal, so as to obtain a high extraction temperature. The extraction time need be only relatively short and will depend largely on the type and size of apparatus used, on the material being treated and on the number of times the alcohol charge is replaced by a fresh one. Under laboratory conditions, using a Soxhlet type apparatus, very good results have been obtained in two hours.

The recovery of the alcohol from the extraction miscella is best carried out by distillation after acidification with a non-volatile acid such as sulphuric or phosphoric acid. The acid concentration is not critical provided sufficient is present to form salts with the volatile bases in the miscella.

The product obtained by the process of the invention has only negligible solubility in water and only limited solubility in dilute aqueous alkali (pH 12).

Further treatment of the product after removal of residual alcohol, where necessary, by any conventional method will depend on the use to which the product is to be put. Excess reducing agent may be washed out with water and the pH of the product adjusted to the desired value, frequently to neutrality or thereabouts, by the addition of acid. The product may then be dried by any conventional method, for instance tray-drying, to give a substantially odourless and tasteless material.

The final product may, for instance, be incorporated as a protein supplement in foodstuffs such as wheat flour.

Example 1

Fresh gutted comminuted cod was mixed with 1% of its weight of sodium sulphite and sufficient aqueous sodium hydroxide to raise the pH to 10. A stiff gelatinous mass was thus obtained. This was then passed through twin rollers which were internally heated by steam at a pressure of 2.8 kg./cm.$^2$ and which were set to a clearance of 0.008 cm. The rollers of 15.2 cms. diameter and 19.7 cms. width rotated at a speed of 3 revs./min. and the throughput was at the rate of 7.25 kg. of mixture per hour.

2.75 kg. of the dried material was placed in a Soxhlet apparatus, the boiler of which contained 50 litres of 95% ethanol to which 900 grams of 36 N sulphuric acid had been added. The boiler was heated by an electric mantle. The extraction was allowed to proceed for three hours during which syphoning occurred every 45 minutes.

At the completion of extraction residual alcohol contained in the material was evaporated off. The material was then suspended in water and the pH adjusted to 7 by the addition of hydrochloric acid. After filtration, the material was washed twice by suspending in water, stirring and filtering and was then tray-dried at 50° C. for 4 hours.

The resultant product was white and substantially odourless and flavourless. 5 grams of the product were suspended in 150 cc. water in a can, the can was sealed and then heated for 30 minutes in an autoclave with steam at 1.05 kg./cm.$^2$ pressure. The product was substantially odourless and tasteless.

Example 2

Fresh gutted comminuted cod was treated as in Example 1 except that no sodium sulphite was added to it. The product obtained was similar, though not quite as satisfactory, as that obtained in Example 1.

Example 3

Fresh gutted comminuted cod was treated as in Example 1 except that no sodium hydroxide was added to it. The product obtained was similar, though not quite as satisfactory, as that obtained in Example 1.

We claim:

1. In a process of removing fishy smell and taste from a proteinaceous material selected from the group consisting of fish, whale flesh, and protein obtained therefrom by extraction with an alcohol having at most four carbon atoms the improvement of carrying out the extraction at a pH of at least 8.

2. A process as set forth in claim 1 in which the pH is between 9 and 12.

3. A process as set forth in claim 2 in which the pH is about 10.

4. A process as set forth in claim 1 in which the alcohol is selected from the group consisting of ethyl and isoproyl alcohol.

5. A process as set forth in claim 1 in which the extraction is carried out under pressure greater than 1 atmosphere.

6. A process as set forth in claim 1 in which the extraction is carried out with alcohol at a temperature in the neighbourhood of the boiling point, under the pressure conditions used, of the alcohol.

7. A process as set forth in claim 1 in which the proteinaceous material is dried before the extraction.

8. A process as set forth in claim 1 in which the extraction is carried out in the presence of a reducing agent.

9. A process as set forth in claim 1 in which the extraction is carried out in the presence of a reducing agent in an amount of at least 2.5% by weight (on a dry basis) of the proteinaceous material.

10. A process as set forth in claim 1 in which the extraction is carried out in the presence of a salt of sulphurous acid.

11. In a process of removing fishy smell and taste from a proteinaceous material selected from the group consisting of fish, whale flesh, and protein obtained therefrom by extraction with an alcohol having at most four carbon atoms the improvement of carrying out the extraction in the presence of a reducing agent.

12. A process as set forth in claim 11 in which the alcohol is selected from the group consisting of ethyl and isopropyl alcohol.

13. A process as set forth in claim 11 in which the extraction is carried out under pressure greater than 1 atmosphere.

14. A process as set forth in claim 11 in which the extraction is carried out with alcohol at a temperature in the neighbourhood of the boiling point, under the pressure conditions used, of the alcohol.

15. A process as set forth in claim 11 in which the proteinaceous material is dried before the extraction.

16. A process as set forth in claim 11 in which the amount of reducing agent is at least 2.5% by weight (on a dry basis) of the proteinaceous material.

17. A process as set forth in claim 11 in which the amount is about 5%.

18. A process as set forth in claim 11 in which the reducing agent is a salt of sulphurous acid.

19. In a process of removing fishy smell and taste from a proteinaceous material selected from the group consisting of fish, whale flesh, and protein obtained therefrom by extraction with an alcohol having at most four carbon atoms the improvement of carrying out the extraction at a pH of about 10 and in the presence of about 5% sodium sulphite by weight (on a dry basis) of the proteinaceous material.

20. A process as set forth in claim 19 in which the extraction is carried out under pressure greater than 1 atmosphere.

21. A process as set forth in claim 19 in which the extraction is carried out at a temperature in the neighbourhood of the boiling point, under the conditions of pressure used, of the alcohol.

References Cited in the file of this patent

UNITED STATES PATENTS

| | | |
|---|---|---|
| 1,934,677 | Ash | Nov. 14, 1933 |
| 2,280,024 | Bedford | Apr. 14, 1942 |
| 2,289,780 | Hickman | July 14, 1942 |

FOREIGN PATENTS

| | | |
|---|---|---|
| 727,072 | Great Britain | Mar. 30, 1955 |